Oct. 28, 1969   L. MATHERNE   3,475,038
PIPE STABBER WITH SETSCREWS
Filed Jan. 8, 1968   2 Sheets-Sheet 1
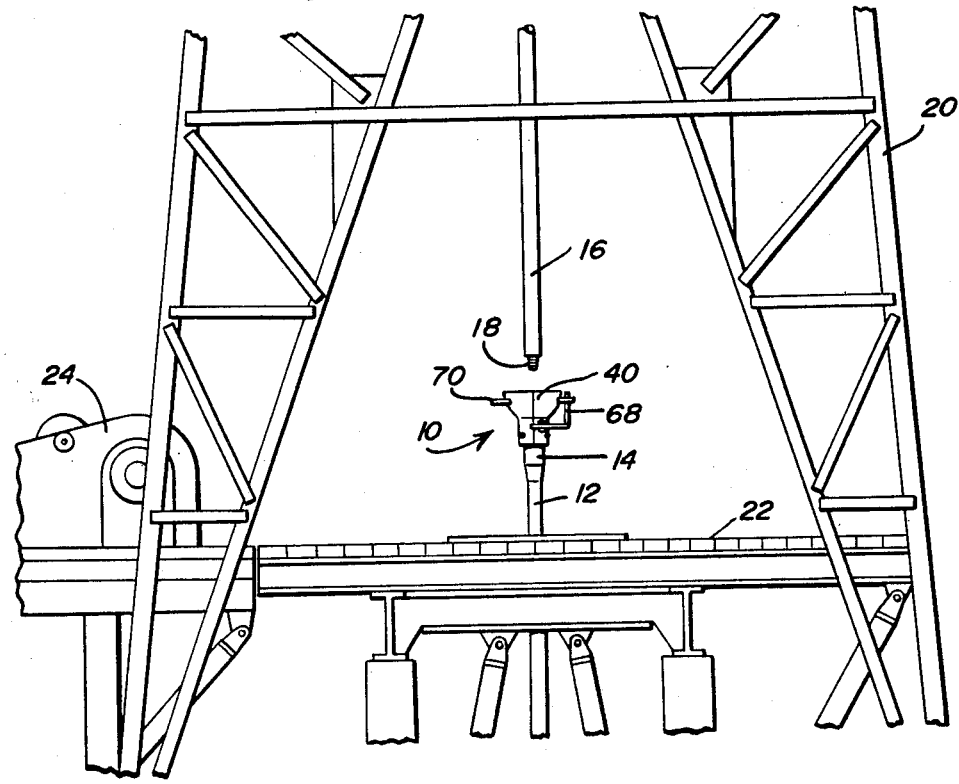
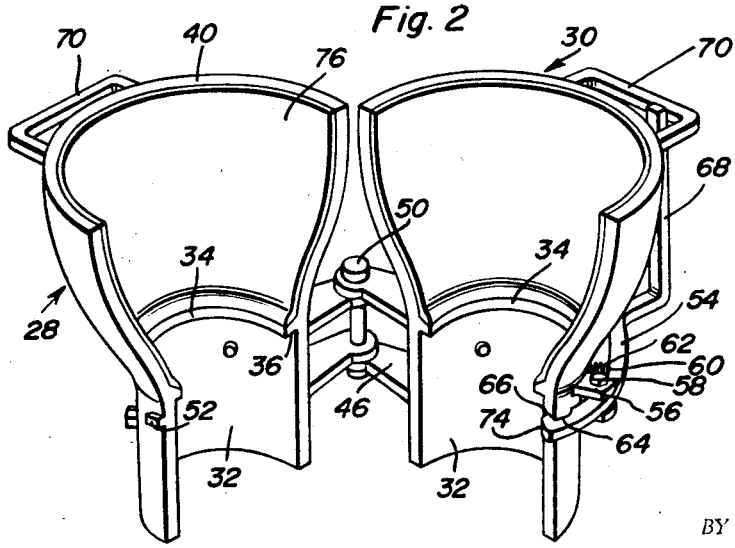
Lee Matherne
INVENTOR.

Oct. 28, 1969   L. MATHERNE   3,475,038
PIPE STABBER WITH SETSCREWS
Filed Jan. 8, 1968   2 Sheets-Sheet 2
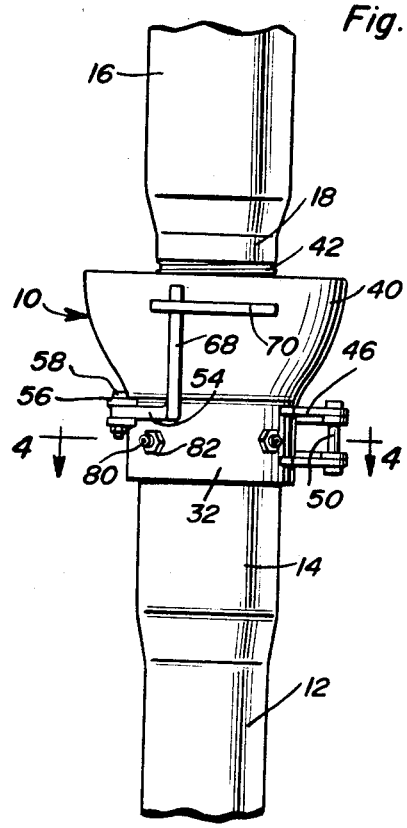
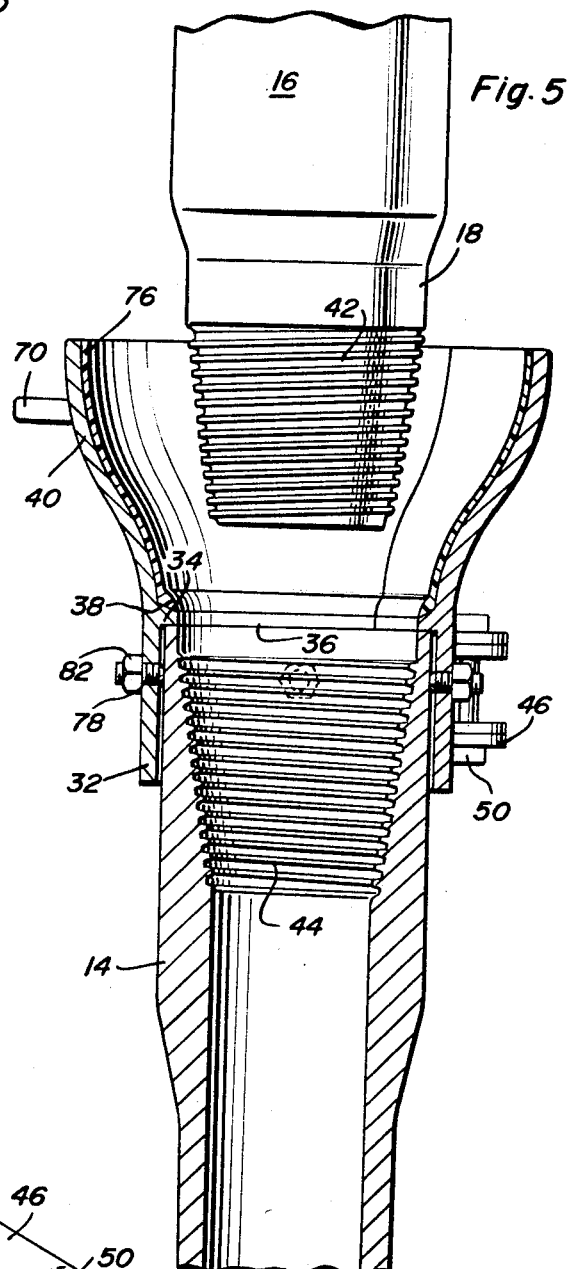
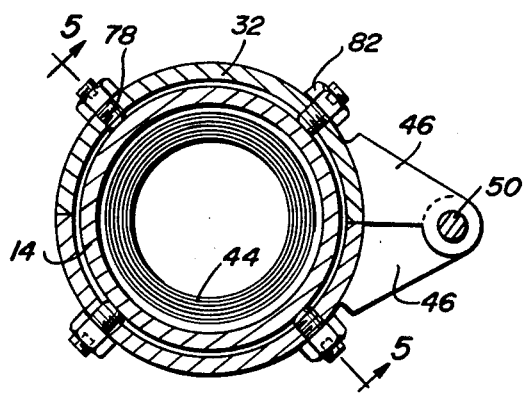
Lee Matherne
INVENTOR.
BY Clarence A. O'Brien
and Harvey B. Jacobson
Attorneys

United States Patent Office 3,475,038
Patented Oct. 28, 1969

3,475,038
PIPE STABBER WITH SETSCREWS
Lee Matherne, 2717 W. Main St., Houma, La. 70360
Continuation-in-part of application Ser. No. 653,423,
July 14, 1967. This application Jan. 8, 1968, Ser.
No. 696,422
Int. Cl. F16l 55/00
U.S. Cl. 285—27       7 Claims

ABSTRACT OF THE DISCLOSURE

A pipe stabber serving as a guide for the pin thread ends of a drill string joint when inserting it into engagement with the box threads of the tool joint during normal well drilling operations. The pipe stabber or guide is in the form of a longitudinally split funnel-shaped device in which the two sections thereof are hingedly interconnected and provided with a readily releasable latch mechanism to retain the two sections in connected relation to form generally a cylindrical lower end for engagement with the upper end of a tool joint box with the upper end of the pipe stabber or guide being outwardly flared and provided with a centrally disposed flange resting against the upper end of the tool joint box for guiding the tool joint pin into the tool joint box. Setscrews are provided for securing the pipe stabber to the upper end of the tool joint box.

---

This application is a continuation-in-part of my copending application Ser. No. 653,423, for Pipe Stabber, filed July 14, 1967 now abandoned.

In present well drilling practice, considerable difficulty is experienced in effecting the threaded connection between the sections or joints of a drill string or pipe. This operation usually requires a person or persons aligning a tool joint or drill pipe section with a lower or previously lowered drill pipe joint or section by manual exertion of lateral force on the pin end of the upper tool joint while it is lowered into engagement with the box or threads of the lower drill pipe section or joint. In view of the weight of the drill pipe joints, this is a problem of considerable magnitude and it therefore is an object of the present invention to provide a pipe stabber in the form of a guide for detachable engagement with the box end of a drill pipe joint or section with the upper end of the pipe stabber or guide being outwardly flared to form an enlarged funnel-shaped upwardly opening upper end for receiving the pin end or threads of the drill pipe section or joint to decrease the time and effort required in effecting the threaded connection between the tool joints and at the same time protecting the threads against damage during such connection.

Another object of the present invention is to provide a pipe stabber or guide which is simple in construction, easy to apply and remove, effective for the purpose of guiding the tool joint into the tool joint box and relatively inexpensive to manufacture.

In some arrangements, the tool joint box is worn on the outer surface thereof and setscrews are provided for locking the pipe stabber securely in place on the upper end of the tool joint box for guiding the tool joint pin into the tool joint box.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a schematic view of the pipe stabber of the present invention installed in position for use thereof;

FIGURE 2 is a perspective view of the pipe stabber illustrating the two sections thereof pivoted to an open position;

FIGURE 3 is a side elevational view of the pipe stabber installed in position for use for guiding a tool joint pin into a tool joint box;

FIGURE 4 is a transverse, sectional view taken substantially upon a plane passing along section line 4—4 of FIGURE 3 illustrating the structural details of the setscrew structures and their relationship to the pipe stabber and tool joint box; and FIGURE 5 is a longitudinal, sectional view taken substantially upon a plane passing along section line 5—5 of FIGURE 4 illustrating the structural details and relationship of the pipe stabber to the tool joints.

Referring now specifically to the drawings, the pipe stabber comprising the present invention is generally designated by the numeral 10 and is illustrated in use with a drill tool joint 12 having the usual box 14 at the upper end thereof and which has been lowered into position during the normal drilling operation with an upper drill tool joint 16 being lowered into engagement therewith with the pin end 18 engageable with the box 14 all of which represents conventional drilling apparatus and techniques. As illustrated in FIG. 1, the derrick 20 is provided with the usual cable 22 and a conventional draw works or winch 24 is provided for manipulating the upper drill tool joint 16 in a conventional manner. The specific details of the oil well drilling apparatus are not disclosed inasmuch as they form no particular part of the present invention in that conventional apparatuses and techniques are employed.

The pipe stabber or guide 10 is generally a funnel-shaped member having two sections generally designated by numeral 28 and 30. Each of the sections 28 and 30 has a lower semi-cylindrical end 32 having the upper end thereof delineated by an inwardly extending flange 34 which forms a flat and substantially horizontal shoulder 36 on the lower surface thereof for engagement with the upper end of the tool joint box 14 as illustrated in FIG. 4, with the inner diameter of the flange 34 generally coinciding with the inner diameter of the tool joint box 14. The upper surface of the flange 34 is inclined as at 38 to form a guide surface for the tool joint pin 18. The flanges 34 serve to protect the face of the tool joint 14 and to keep pin 18 from setting down on face of collar 14 which could damage or make indentations in the facing of the tool joint causing a leak or washout. Also, the flanges 34 align and hold the pipe stabber in position over tool joint 14. Also, each section 28 and 30 of the pipe stabber or guide 10 is provided with an outwardly flared upper end 40 in which the upper end is of larger diameter than the flange 34 and the cylindrical ends 32 thus forming a relatively large diameter for easy insertion of the tool joint pin 18 into the pipe stabber or guide so that the threads 42 on the tool joint pin may be easily associated with the threads 44 on the tool joint box 14.

Extending laterally from each of the semi-cylindrical ends 32 is a pair of hinge plates or lugs 46 which have their inner ends welded or otherwise fixedly secured to the semi-cylindrical ends 32. The outer ends of the pivot plates or lugs 48 are disposed in overlapping aligned relation for receiving a hinge pin or bolt 50 for pivotally interconnecting the sections 28 and 30 for relative pivotal movement about an axis parallel to the longitudinal axis of the drill tool joints and laterally spaced therefrom so that the sections 28 and 30 may pivot to an open position as illustrated in FIGURE 2 and then be swung into a closed position as illustrated in FIGURES 3–5.

For latching the sections 28 and 30 in closed position, the section 28 is provided with a laterally extending lug 52 adjacent the free edge of the upper end of the semi-cylindrical section 32 as illustrated in FIGURES 2 and 5. An elongated arcuately curved latch member 54 is mounted on the semi-cylindrical end 32 of the section 30 and is in circumferential alignment with the lugs 52. The latch member 54 has an intermediate portion hingedly received between a pair of supporting lugs 56 with a pivot bolt 58 extending through the lugs 56 and through the arcuate latch member 54 thus pivotally mounting the latch member 54 from the semi-cylindrical end 32 of the section 30 of the pipe stabber or guide 10. As illustrated, the latch member 54 is spaced laterally of the semi-cylindrical end 32 and a coil compression spring 60 is interposed between the latch member 54 and the semi-cylindrical end 32 in spaced relation to the pivot bolt 58 as illustrated in FIGURE 5 thus biasing the opposite end of the latch member 54 inwardly toward the pipe stabber or guide 10. In order to retain the spring 60 in place, the ends thereof may be received in recesses 62 or otherwise anchored to the latch member 54 and the semi-cylindrical end 32 of the section 30. The end of the latch member 54 remote from the spring 62 and on the opposite side of the pivot bolt 58 is provided with a notch 64 in the inner surface thereof thus defining a hook-like projection 66 which will engage behind the lug 52 for securing the sections 28 and 30 in closed position. The lug 52 serves as a keeper for the latch member 54 with the engaging surfaces thereof generally lying along a radial axis of the semi-cylindrical end 32 so that any outward pressure exerted on the sections 28 and 30 such as by the tool joint pin 18, coming into contact therewith, will not result in any camming action against the latch member 54.

The end of the latch member 54 remote from the recess 64 is provided with a handle 68 which is generally perpendicular to the latch member 54 and extends longitudinally of the section 30 of the pipe stabber or guide 10 with the handle 68 being arcuate curved and conforming with the external curve surface of the outwardly flared upper end 40 of the section 30 of the pipe stabber 10.

The terminal end of the handle 68 extends interiorly on a loop-shaped handle 70 rigid with the section 30 of the pipe stabber 10 so that when the handle 70 is grasped, some pressure can be exerted against the handle 68 to pivot the latch member 54 about the pivot bolt 58 thus releasing the hook-like projection 66 from engagement with the lug 52 to enable the latch member 54 to be released. The section 28 is provided with a handle 70 identical to the handle 70 on the section 30 and these handles are in substantially the same horizontal plane and extend substantially perpendicular to the pipe stabber adjacent the upper end thereof to enable a person to easily grasp the two diametrically opposed handles 70 and assemble and disassemble the pipe stabber in relation to the tool joint box 14. It is noted that the surface of the lug 52 facing the free edge of the section 28 is inclined as at 72 and the outer end of the hook-like projection 66 is also inclined as at 74 to form a camming action to enable the device to be assembled by merely placing the semi-cylindrical ends 32 in alignment with the upper end of the tool joint box 14 and snapping the sections 28 and 30 into closed position by merely urging the sections 28 and 30 toward each other about the hinge bolt 50. The inclined surfaces 72 and 74 will cam the free end of the latch member 54 outwardly and the spring 60 will cause the hook-like projection 66 to drop behind the lug 52 thus latching the sections 28 and 30 in closed position and assembling the pipe stabber 10 on the tool box joint 14. After the tool joint pin 18 has been assembled with the box 14, before the threading operation has been completed, the pipe stabber 10 may be easily removed by grasping the handle 70 and pushing the handle 68 for the latch member 54 inwardly after which the sections 28 and 30 may be pivoted apart and the pipe stabber 10 removed so that the threaded pin and box connection may be completed between the tool joints 12 and 16 in a conventional manner.

The interior surface of the outwardly flared upper ends 40 of the sections 28 and 30 may be provided with a coating or liner or resilient material 76 such as a rubber or plastic material bonded or otherwise secured to the inner surface of that portion of the pipe stabber disposed above the flange 34 to further reduce damage to the threads 42 in the event of engagement between the threads 42 and the inner surface of the outwardly flared sections 40 of the pipe stabber 10.

In structures in which the lower tool joint box 14 is worn by engagement with the interior of the well casing during normal drilling operation, the semi-cylindrical lower ends 32 each are provided with a pair of radially extending setscrews 78 threaded therethrough for clamping engagement with the exterior surface of the tool joint box 14 as illustrated in FIGURES 4 and 5. The outer end of each setscrew 78 is provided with a polygonal socket or recess 80 for receiving an Allen wrench to enable adjustment of the setscrews 78. Lock nuts 82 which secure the setscrews 78 in adjusted position after they have been initially adjusted by using the Allen wrench.

This construction is most beneficial where the stabber is being used on worn tool joints. The setscrews are adjusted into clamping engagement with the tool box joint and the position of the setscrews may be varied depending on the degree of wear of the tool joints of the string of pipe on the rig. The setscrews 78 are equally spaced around the pipe stabber and may be approximately five to six inches apart and approximately one and one-half inches below the flange 34 to assure adequate gripping engagement with the tool joint box 14. This will assure that the flange 34 will be centralized and retained against the face of the tool joint box so that the pin threads 42 will be aligned with the box threads 44.

Thus, with the present invention, the assembly of the drill tool joints or lengths is facilitated with considerably less damage to the pin and box threaded connection and with considerably less effort on the part of the persons whose responsibility is to guide the pin thread joint into the tool joint box. With this construction, the pipe stabber or guide may be easily installed on the tool joint box and also readily removed therefrom and may be stored or supported in a convenient position for subsequent use as the drill string proesses downwardly during a conventional drilling operation.

The foregoing is considered as illustrative only of the principles of the invention. Further, since numerous modifications and changes will readily occur to those skilled in the art, it is not desired to limit the invention to the exact construction and operation shown and described.

What is claimed as new is as follows:

1. A vertical pipe stabber comprising an annular member split longitudinally into two substantially identical sections, means interconnecting said sections to enable relative movement therebetween for mounting the lower end portion of the annular member on the upper end of a pipe, means on said annular member for engaging the upper end of the pipe for preventing axial downward movement of the annular member with respect to the pipe and for retaining the annular member in position in alignment with the pipe, the upper end portion of said annular member extending axially upwardly and radially outwardly from the pipe and terminating with a greater circumferential dimension than the pipe mounted end for guiding a member into engagement with the pipe, said means interconnecting the sections including hinge means at one point thereon and a latch means diametrically related to the hinge means, said annular member including handles at the upper end thereof, said latch means including an operating handle extending to a point adjacent one of the handles to enable manipulation thereof with the same hand that grasps the handle.

2. The structure as defined in claim 1 wherein said means on the annular member for engaging the upper end of the pipe includes an inwardly extending flange intermediate the ends thereof for engagement with the end edge of the pipe on which the sections are mounted.

3. The structure as defined in claim 2 wherein said other end of said annular member is outwardly flared from said flange, and a coating of resilient material on the inner surface thereof.

4. For use in combination with a drill tool joint box already inserted into a well bore, a guide for a drill tool joint pin to be threaded to the drill tool joint box, said guide comprising an annular member split longitudinally into a pair of sections, each section having a semi-cylindrical lower end to engage the drill tool joint box, the upper end of each section being outwardly flared to form a funnel-shaped guide for receiving the drill tool joint pin and guiding the threads thereon into engagement with the threads in the drill tool joint box, and means interconnecting said sections for relative movement between an open position and a closed position for enabling assembly and disassembly of the guide in relation to the drill tool joint box, said means interconnecting the sections including hinge means at one edge thereof, and latch means at the other edge thereof, said guide including a handle at the upper end of each section, and an operating handle means connected with the latch means for operation thereof, said operating handle means extending to a point adjacent one of said handles for manually manipulating the latch means while grasping said handle, said annular member including an inwardly extending flange for overlying engagement with the facing of the tool joint box to prevent the tool joint pin from setting down on the facing of the tool joint box thereby eliminating indentation of the facing for preventing leaks and washouts, said flange also retaining the guide in position in alignment with the tool joint box.

5. The structure as defined in claim 4 wherein said annular member includes a plurality of circumferentially spaced radially extending setscrew means therein for engaging the periphery of the tool joint box to align the flange in overlying relation to the facing of a worn tool joint box and to retain the flange in that position during assembly of the tool joint pin with the tool joint box.

6. The structure as defined in claim 5 wherein said setscrew means includes a plurality of equally spaced radially disposed setscrews threaded through the annular member, and a lock nut threaded on each setscrew exteriorly of the annular member for locking the setscrew in adjusted position.

7. A guide for assisting in connecting vertically disposed elongated members in end to end relation when the lower of said member is disposed in a well, said guide comprising an annular member having a generally cylindrical portion for engagement in encircling relation to the upper end of the lower of said members and an outwardly flared portion for vertically guiding the lower end of the upper of said members into alignment with and engagement with the upper end of the lower of said members, an inwardly projecting annular flange on the central region of said annular member for abutting engagement with the upper end of the lower of said members, said annular member being split longitudinally into two substantially identical sections, hinge means connecting said sections together for relative pivotal movement, latch means releasably interconnecting the sections together in diametrically opposed relation to the hinge means thereby enabling the sections to be moved between open and closed positions for assembly and disassembly of the guide in relation to the upper end of the lower of said members, said annular member including handling means including operating means for the latch means for manually handling the guide and manually manipulating the latch means without releasing the handling means to facilitate assembly and disassembly of the guide.

References Cited

UNITED STATES PATENTS

| 172,669 | 1/1876 | Stevens | 285—373 X |
| 746,801 | 12/1903 | Earheart | 285—24 |
| 1,831,878 | 11/1931 | Myracle | 285—27 X |
| 2,319,329 | 5/1943 | Key | 285—24 |
| 2,575,831 | 11/1951 | Pearce | 285—29 |
| 2,823,049 | 2/1958 | Hombach | 285—404 X |
| 2,913,262 | 11/1959 | De Cenzo et al. | 285—373 X |
| 3,028,180 | 4/1962 | Smith | 285—404 X |

FOREIGN PATENTS

| 108,928 | 11/1939 | Australia. |
| 571,345 | 2/1933 | Germany. |

THOMAS F. CALLAGHAN, Primary Examiner

U.S. Cl. X.R.

285—334, 404, 419